May 4, 1943.   W. C. BENNETT ET AL   2,318,280
METERING SYSTEM
Filed April 28, 1942   3 Sheets-Sheet 1

INVENTORS
William C. Bennett
and William Melat
BY
Cornelius D. Ehret
ATTORNEY.

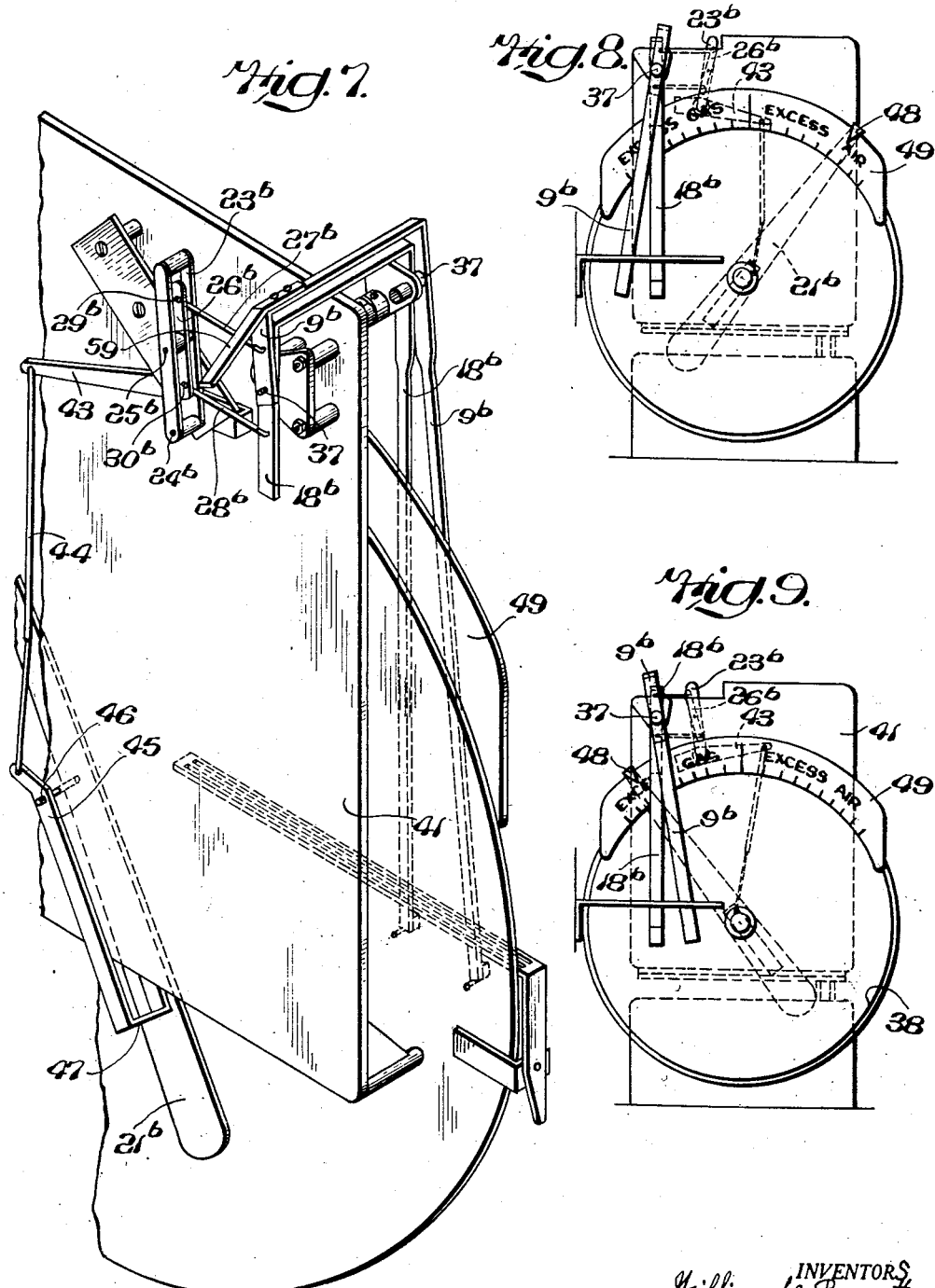

Patented May 4, 1943

2,318,280

UNITED STATES PATENT OFFICE 2,318,280

METERING SYSTEM

William C. Bennett, West Chester, and William Melas, Philadelphia, Pa., assignors to Cochrane Corporation, Philadelphia, Pa., a corporation of Pennsylvania Application April 28, 1942, Serial No. 440,776

5 Claims. (Cl. 73—196)

Our invention relates to metering systems and particularly concerns apparatus for indicating and/or recording conditions determining or determined by the operation of steam generators, furnaces and the like.

In accordance with our invention, two members, each positioned in accordance with the magnitudes of a condition, for example the rates of flow of a fluid, and either or both of which may be connected to, or serve as, a pointer or stylus for indicating or recording the flow of that fluid, are mechanically coupled to an indicating or recording element for jointly positioning it in accordance with the concurrent magnitudes of the conditions, more particularly the rates of flow of the two fluids, which term generically comprehends liquids, gases, vapors and comminuted solids.

Our invention further resides in the features of combination and arrangement hereinafter described and claimed.

For an understanding of our invention and for illustration of several forms thereof, reference is made to the accompanying drawings, in which:

Fig. 1 diagrammatically illustrates a system for indicating or recording the deviations from a predetermined ratio of the rates at which fuel and air are supplied to a furnace installation;

Fig. 2, in perspective, illustrates details of a coupling system shown in Fig. 1;

Figs. 3 and 4 diagrammatically illustrate other installations to which our invention is applicable;

Figs. 6 and 7 are perspective views of another modification of our invention;

Figs. 8 and 9 are explanatory figures referred to in description of Figs. 6 and 7.

Figure 1:
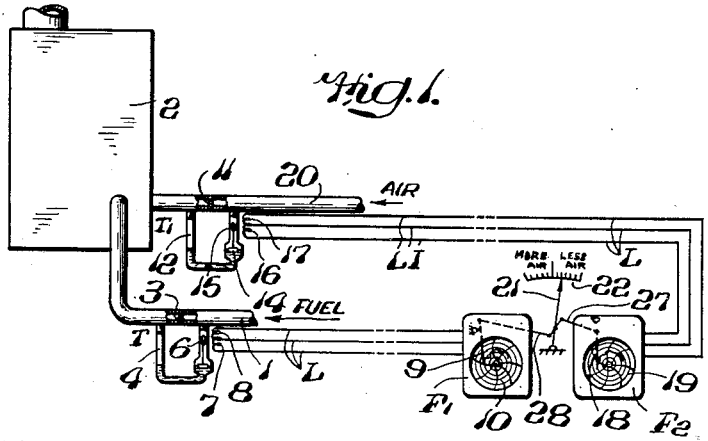

Referring to Fig. 1, the rate at which fuel is supplied, usually in fluid or gaseous phase, through pipe 1 to a furnace or steam generator 2, or the like, is measured and recorded by flowmeter F1 which may be of the type disclosed in United States Letters Patent 2,081,596 to Melas to which reference is made for more complete description of the details of construction. Briefly, there is produced across the restriction 3, such as an orifice plate, venturi, or equivalent, a differential pressure of magnitude dependent upon the rate of flow of fluid through pipe 1 and determinative of the difference in level of the columns of mercury in the legs of the manometer tube 4.

Accordingly for different rates of supply of fuel, the float 5 of the manometer moves the magnetic core member 6 to correspondingly different positions and thus differentially varies the impedances of the coils 7 and 8 which with their common armature or core 6, float 5 and manometer 4 comprise the transmitter T of an electrical telemetric system. The adjustable impedances 7, 8 are connected by conductors L to another pair of differentially adjustable inductances within the housing of the flow meter or recorder F1 and are comprised therewith in a bridge circuit or network which is automatically rebalanced, by the recorder mechanism as described in aforesaid Melas patent, whenever core 6 is moved to a new position.

The mechanism of recorder F1 concurrently with rebalancing adjustment of the measuring network moves the pointer or pen 9 with respect to scale or chart 10 to a position corresponding with the then existing rate of flow of fuel through pipe 1.

In like manner, the mechanism of meter or recorder F2, under control of the telemetric transmitter T1 comprising orifice 11, manometer 12, float 14, core or armature 15 and solenoids 16, 17, positions the pointer or pen 18 with respect to scale or chart 19 in accordance with the then existing rate of flow of fluid, for example air, through pipe 20.

That an unskilled or inexperienced operator, or an operator unfamiliar with the performance characteristics of a particular installation, may properly regulate the combustion in procurement of economical efficient operation of the installation or that the operation of an automatic system for regulating the air and fuel valves may be checked or supervised, the members 9 and 18, whether or not either of them is actually used to indicate or record the rates of flow of fuel and air, are mechanically coupled to the indicating or recording element 21 associated with scale or chart 22 which may be calibrated in terms of fuel-air ratio, or more simply may be divided into two zones suitably labelled "Less air" (or more fuel) and "More air" (or less fuel) or identified by any other legends descriptive of the operating requirements.

Figure 2:
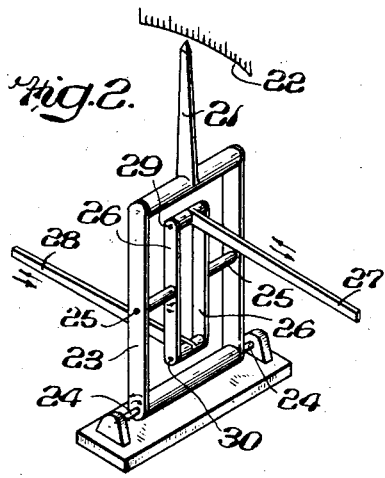

A suitable linkage for coupling the members 9 and 18, positioned respectively in accordance with the rates of flow of fuel and air, to the ratio-indicating pointer 21 may include, as more clearly shown in Fig. 2, a structure or frame 23 pivotally mounted at 24 to a stationary support and carrying or connected to the pointer 21. Upon frame 23 is pivotally mounted, at 25, a second structure or frame 26 to which is pivotally connected, at points or axes 29 and 30 substantially angularly displaced about pivot 25, the links 27, 28 extending respectively to member 18, whose position corresponds with the rate of flow of air, and to member 9, whose position corresponds with the rate of flow of fuel.

Assuming, for example, that while the rate of supply of fuel remains constant, the rate of supply of air is increased the link 27 moves to right and because pivot 30 is then stationary moves frame 26 in clockwise direction about pivot 30; this motion is transmitted through pivot 25 to frame 23 which therefore moves in clockwise direction about its pivot 24 and so moves pointer 21 to position indicating need for more fuel or less air. If concurrently with the increase in rate of supply of air, the rate of supply of fuel is also increased, link 28 moves to the left; if the extents of such movements of link 27, 28, both of which cause clockwise movement of frame 26 about its axis 25, are such that there is no change in position of axis 25, the position of the main frame remains unchanged indicating that optimum ratio of fuel to air has been preserved; if, on the other hand, the rate of supply of fuel increases but to extent insufficient to maintain the prior or optimum ratio of air and fuel, the pointer 21 moves clockwise but to less extent than when pivot point 30 remains fixed; if the rate of supply of fuel increases to excessive extent, pivot 30 is moved by link 28 to the left through a distance greater than pivot 29 is moved to the right by link 27 and consequently frame 26 moves in clockwise direction about pivot 29 and effects movement of frame 23 and pointer 21 in counterclockwise direction about pivot 24 to position indicating excess fuel or need for more air.

For any rate of flow of fuel or of flow of air within the range of meters F1 and F2, the pointer 21, unlike either of pointers 9 and 18 connected thereto, may be in any of its positions with respect to its associated scale. In other words, pointer 21 is positioned in dependence upon the concurrent relative position of pointers 9 and 18 and independently of the sole position of either of pointers 9 and 18 (or equivalent member positioned respectively in accordance with concurrent magnitudes of the rates of flow of air and fuel).

In installations having such operating characteristics that the optimum ratio of air to fuel is not constant but varies as a function of the fuel and/or air demand, compensation may be introduced to ensure the pointer 21 throughout the range of variation of fuel and air nevertheless always indicates by its relation to scale 22 whether the ratio is optimum or to what extent the fuel or air should be increased or decreased. Preferably, by test made for a particular installation, it is determined what should be the ratios of fuel to air to obtain the desired economy and efficiency at different loads throughout the operating range of the furnace. A deformable cam is then set so that pointer 21 remains in position indicating optimum ratio of air and fuel as members 9 and 18 are concurrently moved to the various positions which by aforesaid test were determined to afford desired operating conditions for different systems demands.

Figure 3:
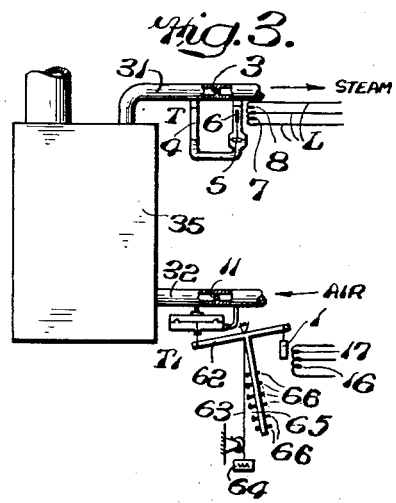

In the particular arrangement shown in Fig. 3, the deformable cam 65 comprises the envelope or outline defined by the members 66 individually adjustable to determine the angular position of arm 62 at which each member 66 in turn engages or disengages the strap 63, or equivalent flexible member attached to or supporting the weight 64 or equivalent biasing means.

Upon the assumption the amount of air required to produce a given number of heat units by substantially complete combustion of any given kind of fuel for example, coal, oil, or natural gas, is substantially constant despite variations in quality of that fuel, it is desirable in the operation of steam generators to indicate or record the relation of the rates of flow of air and steam that the operator may properly regulate the supply of fuel and air to maintain the optimum conditions of combustion. To that end in the steam-generator system of Fig. 3, the transmitter T1, as in Fig. 1, may be utilized to transmit variations in rate of flow of combustion air to flow-meter F2, and transmitter T, Fig. 3, may be utilized to transmit variations in rate of flow of steam to another suitably calibrated flow-meter F—1. The members 9 and 18 of the two flow meters are, as shown in Fig. 2 and previously described, coupled to an indicating element 21 by a mechanical linkage 24—30 which provides that element 21 shall indicate the deviations from optimum or predetermined ratio of the two rates of flow respectively determining the positions of members 9 and 18.

Figure 4:
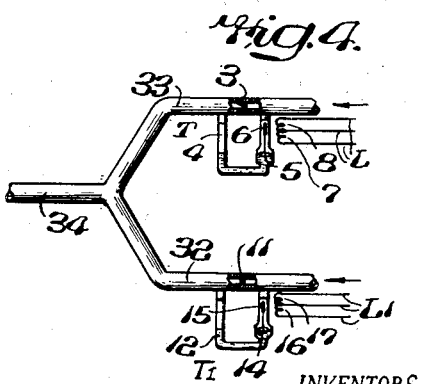

The same telemetric receiver arrangement of flowmeters F1 and F2 coupled to indicator 21 may be utilized, Fig. 4, to indicate the departures from predetermined ratio to each other of the rates of flow of two fluid fuels, for example, natural gas and producer gas, separately or in mixture fed to the combustion chamber of a furnace, steam-generator, or the like. The transmitter T1 responsive to the variations in the rate of flow through pipe 32 of one of the fluids controls the meter F2, or equivalent, and transmitter T responsive to the variations in the rate of flow through pipe 33 of the other of the fluids controls meter F1 which jointly with meter F2, as described in connection with Figs. 1 and 2, controls the pointer or equivalent element 21 to indicate the variations from predetermined proportions to each other of the fluids comprising the fuel mixture in pipe 34.

In all of the systems of Figs. 1 to 4, the element 21 may be provided with or comprise a marking element such as stylus or pen and the chart 22 may be comprised on a disk or sheet movable with respect to element 21 for the recording of its excursions from optimum or desired position.

Figure 5:
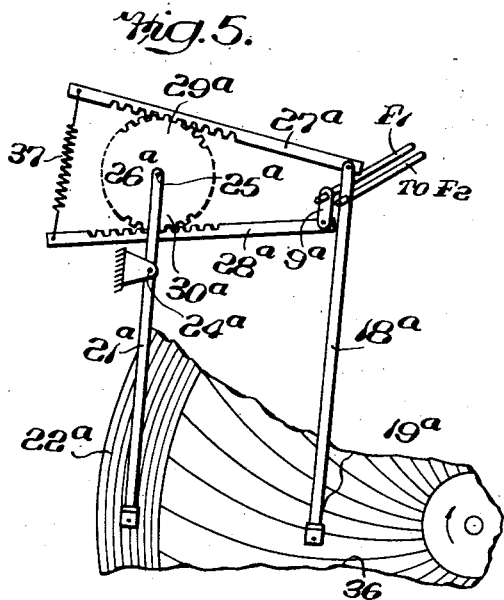
Fig. 5 shows significant elements of a modification of Fig. 2.

In the modification shown in Fig. 5, for recording of the rates of flow of one fluid, for example steam from the generator 35, Fig. 3, and of the variations from predetermined ratio of the rates of flow of that fluid and of another fluid, for example, total combustion air, Fig. 3, there may be used a mechanical linkage similar to that shown in Fig. 2 or preferably the alternative arrangement shown in Fig. 5 now described.

The member 21A is pivotally mounted at 24A to suitable stationary structure such as a frame member of the apparatus for movement relative to a scale which is stationary when member 21A is used simply as an indicator or which as shown in Fig. 5 may comprise a portion 22A, such as the marginal area of a recorder sheet or disc 36 upon which is also suitably marked the scale 19A for co-operation with the marker arm 18a responsive for example to changes in rate of flow of steam, Fig. 2.

Upon the arm 21A is pivotally mounted at 25A, the gear, gear segment 26A, or equivalent, engaged at points 29A and 30A, suitably angularly displaced with respect to pivotal axis 25A, by the rack members 27A, 28A, or equivalent respectively connected to arms 9A and 18a which by mechanisms of the character hereinbefore discussed are positioned respectively in accordance with the rates of flow of air and steam, Fig. 2, or more generally, in accordance with the magnitudes of two conditions whose desired ratio and deviations therefrom are to be indicated or recorded by member 21A.

To maintain the driving members 27A, 28A in engagement with gear 26A, or equivalent driven member, they may be connected by spring 37 or otherwise jointly or independently biased into continuous engagement with member 26A.

The description of the operation of the mechanical coupling of Fig. 2 closely applies to Fig. 5 and need not be repeated. It suffices here to say that so long as arms 9A and 18a retain their same relative position, the arm 21A, notwithstanding movements of racks 27A, 28A, remains stationary; if either of racks 27A, 28A alone moves, or if they both move in either direction but to different extents, or if they both move in the same direction, the indicating or recording arm 21A changes its position in accordance with the change in relative position of arms 9A and 18a.

If, with the rotating chart arrangement of Fig. 5, optimum operating conditions are maintained the record drawn by the marking element 21A is or closely approximates a circle; if the recorder is of the strip chart type, the record drawn by marker 21A under such circumstance is a straight line parallel to the direction of feed of the chart. The record traced by pen 18a, or equivalent, is on the same time scale as the ratio record traced by pen 21A so that it is possible, when the apparatus is used with the system of Fig. 2 for example, to determine when and under what load conditions, efficient combustion was or was not maintained.

By extending arm 9A to form a marking element or connecting it to a marking element, the variations in magnitude of both the rates of flow of steam and air, or other two variables, may be recorded on the single chart 36.

In the modification shown in Figs. 6-9, the pen or marker arms 9B, 18B are co-axially pivoted at 37 for movement across the front face of recorder chart 38 rotated by electric motor or equivalent constant speed device. The upper ends of the arms 9B, 18B are U-shaped to straddle the front plate or frame member 41 between which and a second plate or frame member 42 is disposed mechanism of flow meter F2 which positions the arm 18B in accordance with the rate of flow of steam, for example. To the rear of frame member 42 is disposed the flow-meter mechanism F1 which effects positioning of the recording member 9B in accordance with the rate of flow of air, for example. As previously herein stated these mechanisms may be of the type shown in U. S. Letters Patent 2,081,596.

Figure 6:
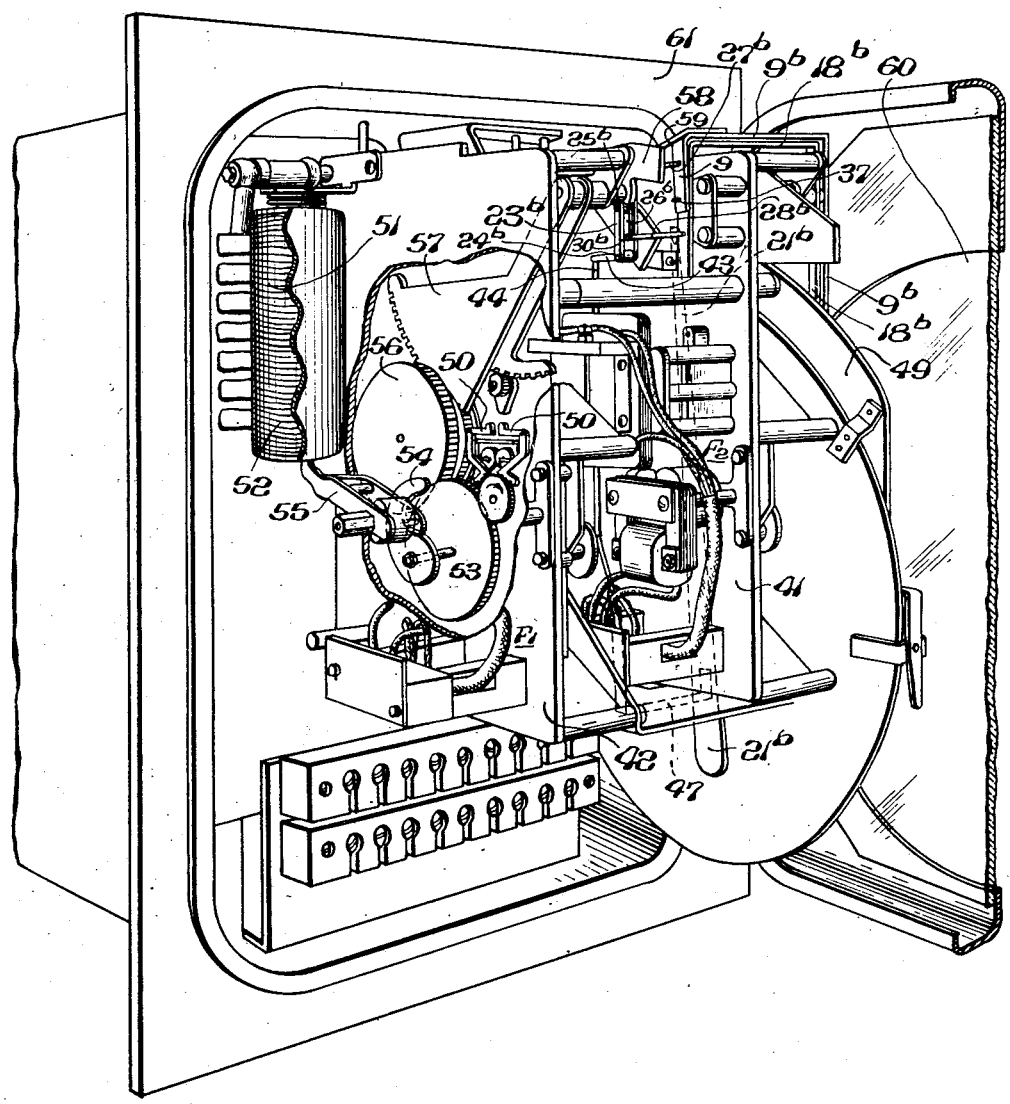

In Fig. 6, the door of the housing 61 is open and the supporting frame upon which is mounted the various components of the apparatus is swung outwardly to expose significant parts of them.

Upon the rear face of plate 41 is pivotally supported at 24B the frame 23B corresponding generally with frame 23 of Fig. 2. Upon frame 23B is pivotally mounted the structure 26B to which is connected, at points 29B, 30B angularly displaced in respect to its pivot 25B, the links 27B, 28B extending respectively from the recorder arms 9B and 18B on opposite sides of their common pivotal axis 37. Accordingly, as described in connection with Fig. 2, the frame 23B is moved about its axis 24B in accordance with change in relative position of the recorder arms 9B and 18B; so long as the two recorder arms remain in fixed relative position, for example one above the other, there is no movement of frame 23B but upon any relative movement of the two recorder arms 9B, 18B, the frame 23B is moved in a sense and to an extent corresponding with that relative movement—compare for example Figs. 8 and 9.

As more clearly shown in Fig. 7, the frame 23B is connected by arm 43 (movable therewith about pivot 24B) and link 44 to the bell crank lever 45 pivoted at 46 and having an extension 47 extending in front of the frame member 41 and there connected to the pointer 21B whose upper end 48 is visible through the door 60 of the apparatus, as it moves to different positions with respect to the suitably calibrated scale 49.

In this modification, as in all others, the frame 23B or equivalent may either directly or indirectly actuate the ratio indicating or recording arm 21 or equivalent.

In identification of the actuating mechanism for the recorder pen 9B, the feeler members 50, 50, Fig. 6, engage a galvanometer pointer responsive to unbalance of the network comprising inductances 16, 17 (Figs. 1, 3, 4) and a pair of inductances 51, 52 disposed within the recorder housing 61, and, in accordance with the sense and extent of the unbalance, effect angular movement of gear 53 which through cam 54 and arm 55 effects rebalancing adjustment of the core member of solenoids 51, 52. The same movement of gear 53 is transmitted through gear 56 and gear segment 57 to the U-shaped yoke member 58 which embraces the extension 59 extending from the recorder arm 9B.

By a similar mechanical relay system, a galvanometer responsive to unbalance of the network including inductances 7 and 8 effects concurrently with rebalancing adjustments of other impedances of the network corresponding changes in position of the recorder pen 18B.

Other equivalent arrangements may be utilized to position the recorder pens 9B and 18B in accordance respectively with the magnitudes of two rates of flow, or other variable conditions, and irrespective of the particular construction of such actuating mechanisms, the coupling from the arms 9B and 18B to the indicator 21B provides that the position of indicator 21B shall depend upon or be representative of a predetermined ratio and departures therefrom of the concurrent magnitudes of the two rates of flow, or other conditions.

What we claim is:

1. A system for supervision of combustion comprising a member movable in response to changes in magnitude of the rate of supply of one of the components of a combustible mixture, a member movable in response to changes in magnitude of the rate of flow of a fluid determinative, jointly with aforesaid rate of supply of a component of a combustible mixture, of the efficiency of combustion of said mixture, an element, means for controlling said element by said members for movement of said element to positions each determined by the relative positions of said members, and means providing that a single position of said element corresponds with optimum combustion at different required rates comprising deformable cam structure movable with one of said members, and biasing means co-operating with said deformable cam to provide that for successive equal changes of rate of supply of one of said components, the corresponding responsive member is moved to predetermined unequal extents.

2. A system for supervision of combustion comprising a member positioned in accordance with the rate of supply of fuel, a member positioned in accordance with the rate of supply of air for combustion of said fuel, an element means controlled by said members for moving said element to positions corresponding with the relation of concurrent magnitudes of said rates of supply of fuel and air, and means comprising deformable cam structure and variable biasing means associated therewith providing that the relative positions of said members for which the position of said element corresponds with optimum combustion vary in accordance with departure from constancy of the optimum ratio between fuel and air for different rates.

3. A system for supervision of combustion in a steam generator requiring different ratios of fuel to air for optimum combustion throughout the range of generator load, a member positioned in accordance with the rate of flow of air to the combustion chamber of said generator, a member positioned in accordance with the rate of flow of steam from said generator, an element, means coupled to said members for moving said element in response to unequal movements of said members, and means comprising deformable cam structure movable with one of said members and variable biasing means associated therewith for providing that throughout the range of movement of said member displacement of said element from predetermined position corresponds with departure from optimum combustion.

4. A system for supervision of combustion comprising a member and means for moving it in response to changes in the rate of supply of fuel, a member and means for moving it in response to changes in the rate of supply of air for combustion of said fuel, an element, structure coupling said element to said members for movement of said element to positions determined by the relative positions of said members, and means providing that a preselected position of said element shall correspond with the optimum ratios of said rates throughout ranges of variation thereof comprising a deformable cam for effecting unequal extents of movement of one of said members for successive equal changes of one of said rates of supply.

5. Apparatus for indicating or recording the deviations from optimum of the ratios of the magnitudes of two conditions comprising members movable respectively in response to changes in magnitude of said conditions, an element, structure coupling said element to said members for movement of said element to positions determined by the relative positions of said members, and means providing that a preselected position of said element shall correspond with different optimum ratios of the magnitudes of said conditions throughout ranges of variation thereof comprising a deformable cam and a biasing member to variable extent engaged thereby for effecting unequal extents of movement of one of said members for successive equal changes in magintude of one of said conditions.

WILLIAM C. BENNETT.
WILLIAM MELAS.